Patented Apr. 20, 1926.

1,581,898

UNITED STATES PATENT OFFICE.

HERBERT E. WETHERBEE, OF CLEVELAND HEIGHTS, OHIO, ASSIGNOR OF ONE-THIRD TO RICHARD F. GRANT AND ONE-THIRD TO HOWARD M. HANNA, BOTH OF CLEVELAND, OHIO.

PROCESS FOR PRODUCING IRON COKE.

No Drawing.   Application filed June 13, 1924. Serial No. 719,873.

*To all whom it may concern:*

Be it known that I, HERBERT E. WETHERBEE, a citizen of the United States of America, residing at Cleveland Heights, in the county of Cuyahoga and State of Ohio, have invented certain new and useful Improvements in Processes for Producing Iron Coke, of which the following is a specification.

My invention relates to improvements in process for producing iron coke and has for its object the provision of an effective and economical method for producing sponge iron of peculiar properties and distinctive advantages in the art.

The principal use for sponge iron is as a precipitant for cement copper from solutions secured by leaching copper ores. For this purpose the iron should be entirely metallized and in physically as fine a condition as possible to insure rapid precipitation of the copper. The presence of a small amount of fixed carbon is not objectionable if the iron is disseminated throughout the mass as the iron and carbon then act as a galvanic couple and increase the rate of precipitation of the copper.

For this purpose I have produced sponge iron or as I prefer to call it, an iron coke, by precipitating ferrous or ferric hydroxide from iron bearing solutions by means of caustic soda, draining and washing the hydroxides as free as possible from the residual solution and intimately mixing with the proper amount of reducing agent which may be finely pulverized coal, crude oil, containing an asphaltic base, or finely ground charcoal. The resulting mixture is then gradually heated to expel moisture, drive off the combined water from the hydroxides and the temperature raised to the point necessary for complete reduction of the resulting iron oxides. The last part of the operation must be done in a reducing atmosphere and the product must be cooled with the exclusion of air or the iron is immediately oxidized. After the iron coke is cold it is fairly resistant to atmospheric oxidation.

During the preliminary heating process the iron hydroxides shrink in volume and an exceedingly intimate mixture of iron oxides and reducing agent results. Reduction starts at about 200 C. and is complete at about 550 C. The process may be carried out in covered crucibles, reverberatory furnace, rotary kiln or any suitable furnace in which a neutral or reducing atmosphere may be maintained.

The resulting product contains the metallic iron in exceedingly fine state of subdivision and intimately mixed with residual carbon and is an effective precipitant for cement copper. Moreover, said iron particles are exceptionally pure and are available for various industrial uses requiring this quality.

Apparently advantageous results are obtained in practicing the process through thoroughly mixing moist iron hydroxides with any suitable carbonaceous material, since the shrinkage attendant upon driving off the moisture effects the closest adherence of the iron content with the carbon prior to any reducing action.

Having now described the preferred process of my invention, I claim as new and desire to secure by Letters Patent, the following:

1. The herein described process for producing iron coke, which consists in intimately mixing iron hydroxides in moistened condition with suitable carbonaceous material and thereafter heating them in a reducing atmosphere sufficiently to produce sponge iron.

2. The herein described process for producing iron coke which consists in intimately mixing iron hydroxides in moistened condition and carbonaceous material in calculated proportions, evaporating any moisture, and strongly heating the mass sufficiently to produce sponge iron and thereafter cooling it; both in a reducing atmosphere.

In testimony whereof I now affix my signature.

HERBERT E. WETHERBEE.